(12) United States Patent
Serlet

(10) Patent No.: US 9,659,023 B2
(45) Date of Patent: May 23, 2017

(54) MAINTAINING AND USING A CACHE OF CHILD-TO-PARENT MAPPINGS IN A CONTENT-ADDRESSABLE STORAGE SYSTEM

(71) Applicant: upthere, inc., Palo Alto, CA (US)

(72) Inventor: Bertrand Serlet, Palo Alto, CA (US)

(73) Assignee: upthere, inc., Palo Alto, CA (US)

( * ) Notice: Subject to any disclaimer, the term of this patent is extended or adjusted under 35 U.S.C. 154(b) by 575 days.

(21) Appl. No.: 14/205,982

(22) Filed: Mar. 12, 2014

(65) Prior Publication Data

US 2015/0261798 A1 Sep. 17, 2015

(51) Int. Cl.
*G06F 17/30* (2006.01)

(52) U.S. Cl.
CPC .. *G06F 17/30115* (2013.01); *G06F 17/30159* (2013.01)

(58) Field of Classification Search
CPC .............. G06F 17/30088; G06F 17/30; G06F 17/30115; G06F 17/30159
USPC .................................................. 707/600–899
See application file for complete search history.

(56) References Cited

U.S. PATENT DOCUMENTS

| | | | |
|---|---|---|---|
| 6,807,632 B1 | 10/2004 | Carpentier et al. | |
| 8,806,154 B1 * | 8/2014 | Gupta | G06F 11/1448 711/156 |
| 2009/0228511 A1 | 9/2009 | Atkin et al. | |
| 2014/0189270 A1 | 7/2014 | Iwanicki et al. | |
| 2015/0026454 A1 | 1/2015 | Boeuf et al. | |
| 2015/0186393 A1 | 7/2015 | Serlet | |

OTHER PUBLICATIONS

U.S. Appl. No. 14/086,197, filed Nov. 21, 2013, Notice of Allowance, mailed Feb. 13, 2015.

* cited by examiner

*Primary Examiner* — Isaac M Woo
(74) *Attorney, Agent, or Firm* — Hickman Palermo Becker Bingham LLP

(57) ABSTRACT

Techniques for maintaining and using cached child-to-parent mappings in a content-addressable storage system are provided. A cache of child-to-parent mappings is maintained. Each child-to-parent mapping corresponds to a particular chunk in a hierarchy of chunks stored in a content-addressable chunk store, and maps the particular chunk to a parent chunk in the hierarchy of chunks. The hierarchy of chunks includes a first root chunk associated with a file system volume. In response to a change to the file system volume that causes associating a new root chunk with the file system volume, the cache is updated by adding one or more first child-to-parent mappings based on traversing at least a portion of a current file system hierarchy from the new root chunk, and removing one or more second child-to-parent mappings based on traversing at least a portion of a prior file system hierarchy from the first root chunk.

20 Claims, 11 Drawing Sheets

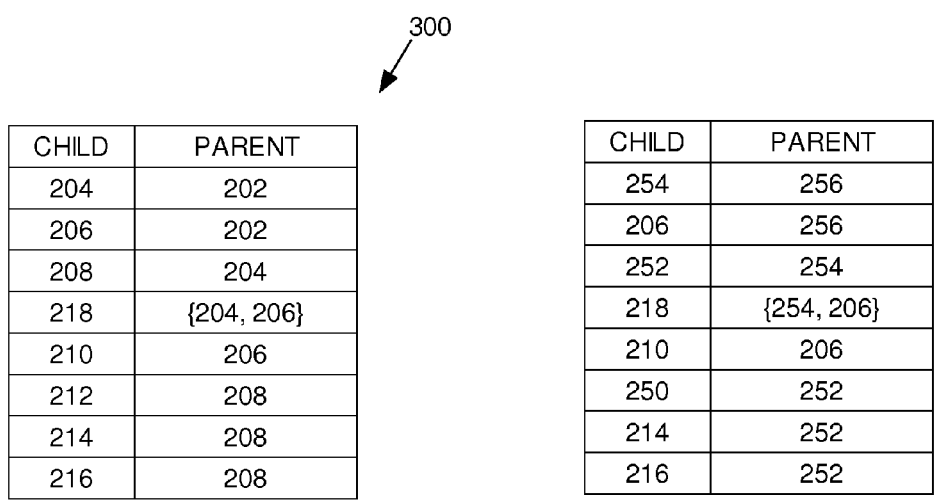
*FIG. 3A*
*FIG. 3B*
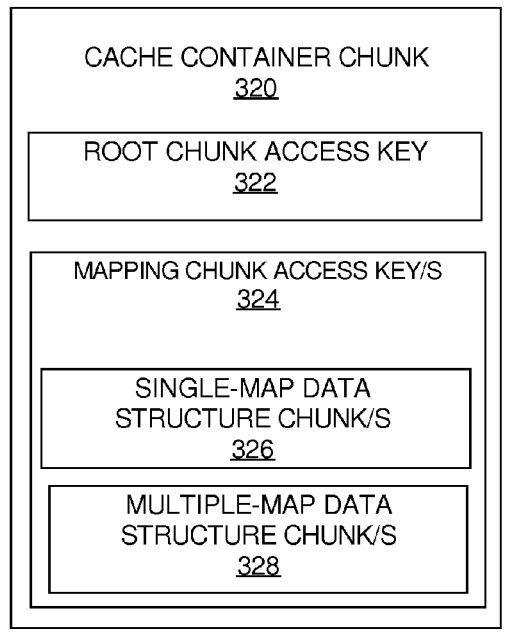
*FIG. 3C*

| CHILD | PARENT |
|---|---|
| 204 | 202 |
| 206 | {202, 256} — 414 |
| 208 | 204 |
| 218 | {204, 206, 254} — 412 |
| 210 | 206 |
| 212 | 208 |
| 214 | {208, 252} — 408 |
| 216 | {208, 252} — 410 |
| 254 | 256 — 402 |
| 252 | 254 — 404 |
| 250 | 252 — 406 |

*FIG. 4A*

| CHILD | PARENT |
|---|---|
| ~~204~~ | ~~202~~ — 452 |
| 206 | {~~202~~, 256} — 464 |
| ~~208~~ | ~~204~~ — 454 |
| 218 | {~~204~~, 206, 254} — 462 |
| 210 | 206 |
| ~~212~~ | ~~208~~ — 456 |
| 214 | {~~208~~, 252} — 458 |
| 216 | {~~208~~, 252} — 460 |
| 254 | 256 |
| 252 | 254 |
| 250 | 252 |

*FIG. 4B*

MAINTAINING AND USING A CACHE OF CHILD-TO-PARENT MAPPINGS IN A CONTENT-ADDRESSABLE STORAGE SYSTEM

CROSS-REFERENCE TO RELATED APPLICATIONS

This application is related to U.S. patent application Ser. No. 14/086,197, filed Nov. 21, 2013, the entire contents of which are hereby incorporated by reference as if fully set forth herein.

FIELD OF THE INVENTION

The present invention relates to storage systems and, more specifically, to techniques for maintaining and using a cache of child-to-parent mappings in a content-addressable storage system.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In typical file systems, stored items are retrieved based on the location at which the items are stored, and a name or identifier of the items. For example, if a file named "foo.txt" is located in a directory named "c:\myfiles\text", then applications may use the pathname "c:\myfiles\text\foo.txt" as the access key to retrieve the file from the file system. Because conventional access keys are based on the location of the items being retrieved, the access keys change when the items are moved within a directory structure of a file system. In addition, each copy of an item has a different access key, because each copy is stored at a different location. On the other hand, when the content of the item is changed, the access key remains the same.

In contrast to conventional file systems, content-addressable storage systems allow retrieval of items based on data that is generated from the content of the items, such as a hash value for the item. Because content-addressable storage systems perform storage-related operations on items based on the content of the items rather than a static location for a particular item associated with a particular filename, applications that request the operations may do so without knowing the number or location of the stored copies of the items.

A chunk storage system is a storage system that performs storage operations without understanding the format or content of the digital information itself. Such storage systems are referred to as chunk storage systems because the systems treat all forms of digital items as if those items were merely opaque chunks of data. For example, the same chunk storage system may be used by word processing applications, image management applications, and calendaring systems to respectively store documents, images and appointments. However, from the perspective of the chunk storage system, only one type of item is being stored: opaque chunks of digital information.

Chunk storage systems may be implemented as content-addressable storage systems. For example, a chunk storage system may generate an access key for a chunk based on its content, such as by applying a cryptographic hash function (e.g. MD5, SHA-1 or SHA2) to the chunk. The chunk store may then store the chunk and maintain indexing data that associates the hash value with the location at which the chunk is stored. When an application subsequently requests retrieval of the chunk, the application provides the hash value to the chunk storage system. The chunk storage system uses the indexing data to locate the chunk associated with the hash value, and provides the chunk thus located to the requesting application.

When an item is represented by one or more chunks in a content-addressable storage system, additional chunk/s must be added to the content-addressable storage system when the item is modified. Because the access key is based on the content, the access key for any chunk corresponding to the modified item will be different from the access key for a chunk corresponding to the original item. Furthermore, references to the original item, such as hash values or other access keys, with only be usable to access the original item, not the modified item.

A file system volume may include one or more files arranged in a folder hierarchy. To store such a file system volume as chunks in a content-addressable storage system, the folder hierarchy itself may be reflected in one or more stored chunks. For example, assume that chunk A represents a folder A, and that chunks B and C represent files within folder A. In this case, the chunk A that represents folder A may include access keys for chunks B and C, thereby reflecting the hierarchical relationship between folder A and files B and C. Such access keys may be used to navigate down the folder hierarchy. However, if a particular chunk is obtained without navigating through the folder hierarchy, such as in response to an index search, the problem arises of determining the position of the particular chunk in the folder hierarchy. Unlike a typical file system with a location-based access key, such as pathname "c:\myfiles\text\foo.txt", the access key of a chunk does not include the position of the chunk in any folder hierarchy.

Furthermore, in a content-addressable storage system, when the contents of a particular file are modified, a new version of the file must be stored at a different address based on the modified content, causing the access key for the new file to change. When a file system hierarchy is represented in one or more chunks, chunks that contain the access key of the original file (i.e. chunks that correspond to items, in the hierarchy, that are above the item that corresponds to the modified chunk) must also be changed to the access key of the new file, causing the generation of additional new chunks in turn. Accordingly, modifying a single file may cause multiple chunks that reflect the hierarchical structure of the file system to change.

One or more indexes may be maintained for chunks of a file system volume stored in a content-addressable storage system. The indexes may identify the chunks of the file system volume by access key. Any such indexes must also be updated when new versions of chunks are stored in the content-addressable storage system. A naive implementation of updating an index involves responding to every chunk change by iterating through the hierarchy from the root chunk and reestablishing the index for all chunks in the file system volume. This is not a scalable solution since it involves iterating through every chunk in the file system hierarchy when any file is modified.

BRIEF DESCRIPTION OF THE DRAWINGS

In the drawings:

FIGS. 3A-3C are block diagrams depicting embodiments of a cache of child-to-parent mappings;

FIGS. 4A-4B are block diagrams depicting embodiments of a cache of child-to-parent mappings that are under modification;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques for maintaining and using a cache of child-to-parent mappings in a content-addressable storage system are provided. A cache of child-to-parent mappings is maintained for chunks belonging to a file system hierarchy. The file system hierarchy includes object chunks that represent files and folders of a file system volume. The chunks are stored in a content-addressable storage system. Each child-to-parent mapping maps a particular chunk to a parent chunk of the hierarchy of chunks. The child-to-parent mappings allow the path of any particular chunk to be determined quickly without traversing the file system hierarchy from its root chunk.

When the file system hierarchy is modified, a new root chunk is generated. The cache of child-to-parent mappings is updated by adding one or more first child-to-parent mappings based on traversing at least a portion of the current file system hierarchy from the new root chunk, and removing one or more second child-to-parent mappings based on traversing at least a portion of the prior file system hierarchy from the prior root chunk. The graph representing the file system hierarchy is frequently modified. Typically, each modification involves a small set of changes made to a large graph. The techniques described herein produces the changes to graph representing the file system hierarchy, in an amount of time that is proportional to the number of changes made to the file system hierarchy instead of an amount of time that is proportional to the size of the graph representing the file system hierarchy, making the update process scalable.

The update process is capable of producing a list of added chunks and a list of removed chunks, or otherwise identifying the differences between the prior file system hierarchy and then current file system hierarchy. The list of added chunks and removed chunks may be used to perform one or more file system maintenance functions. In one embodiment, an index of chunk data associated with the file system volume is efficiently updated based on the added chunks and the removed chunks.

Chunk Store Server

Figure 1:
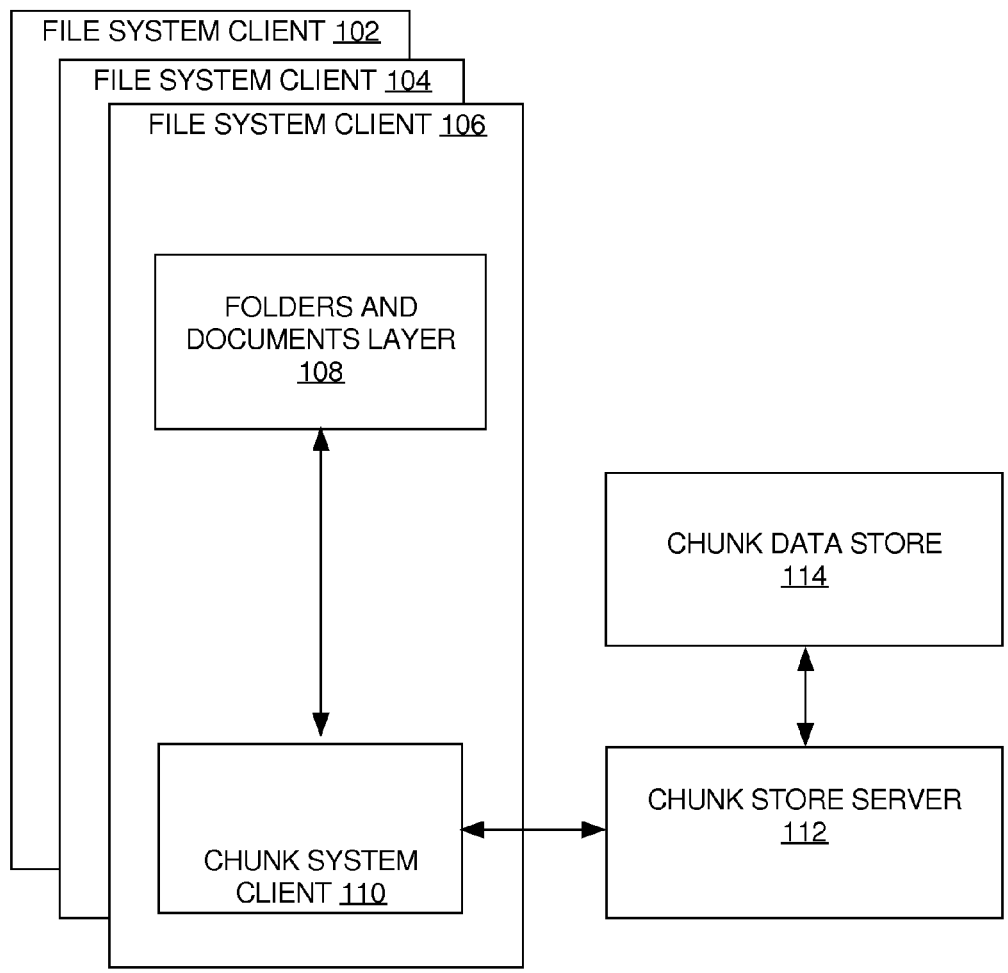
FIG. 1 is a block diagram depicting an embodiment of a system for representing a file system in a content-addressable storage system.

FIG. 1 is a block diagram depicting an embodiment of a system for representing a file system volume in a content-addressable storage system. Chunk data store 114 is a content-addressable storage system configured to store a plurality of chunks. Although a single block is shown, chunk data store 114 may comprise any number chunk data stores, network components, or any other components suitable for implementing a data storage system. In one embodiment, chunk data store 114 and chunk store server 112 are components of a cloud storage server.

Chunk store server 112 provides access to chunks stored in chunk data store 114 via access keys that are based on the chunk content, such as a hash value of the content of a chunk. Examples of hash functions that may be used for generating the access keys include, but are not limited to, MD5, SHA-1 and SHA-2. Although detailed embodiments are described that use hash values as access keys, any other content-based access key may be used with the described embodiments for maintaining and using a cache of child-to-parent mappings in a content-addressable storage system.

File system clients 102-106 are configured to store and access files in one or more file system volumes stored as chunks in chunk data store 114. File system clients 102-106 may correspond to applications, systems, services, or any other type of entity that makes use of a file system. Chunk data store 114 may store chunks belonging to different file system volumes for one or more file system clients 102-106. Furthermore, each of file system clients 102-106 may access one or more file system volumes, and each file system volume may be accessed by one or more file system clients 102-106.

In one embodiment, file system client 106 includes folders and documents layer 108 and a chunk system client 110. File system client 106 may access one or more file system volumes stored by chunk data store 114 through folders and documents layer 108. In one embodiment, folders and documents layer 108 allows users and applications of file system client 106 to access remotely stored file system volumes in a similar manner as a traditional file system. For example, folders and documents layer 108 may present a file system volume stored in chunk data store 114 as a set of folders and documents in a traditional hierarchical file system.

Folders and documents layer 108 communicates with chunk system client 110 to access chunk data store 114 via chunk store server 112. Chunk system client 110 is configured to communicate with chunk store server 112 to access chunk data stored by chunk data store 114. In one embodiment, chunk system client 110 is configured to communicate with chunk store server 112 over one or more networks. In one embodiment, chunk system client 110 is further configured to construct the directory structure of a file system volume based on chunks retrieved from chunk store server 112.

File System as a Hierarchy of Chunks

Chunks may be used to represent a file system hierarchy of a file system volume. In one embodiment, the content-addressable storage system is immutable. Once a chunk of data is stored in association with an access key, such as the hash value of the chunk, the chunk of data cannot be directly modified at the access key location. Rather, a new version of the chunk is created, and the new version is stored separately from the original copy of the chunk. Further, data is stored to associate the location of the new chunk with a new access key, where the new access key is based on the content of the modified chunk. To represent directory structure of a file system volume, which is typically mutable, these access key changes must be taken into account.

Figure 2:
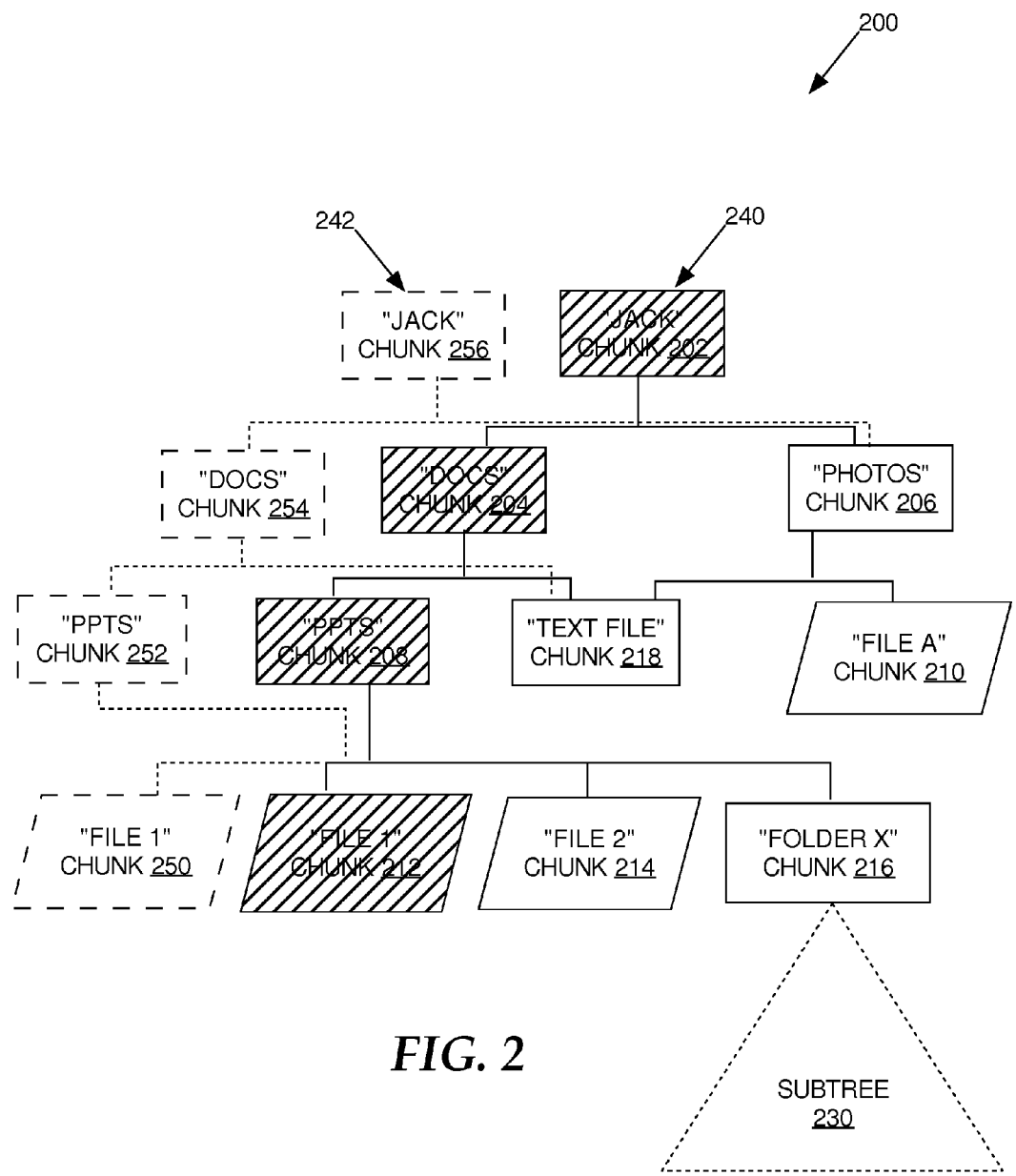
FIG. 2 is a block diagram depicting an embodiment of a hierarchy of chunks before and after a file system modification.

FIG. 2 is a block diagram depicting an embodiment of a hierarchy of chunks before and after a file system volume modification. Structural chunks 202-256 include directory object chunks 202-208 and 252-256 and file object chunks 210-218 and 250. Directory object chunks represent directories of the file system volume, while file object chunks represent files. As used herein, the term "structural chunk" refers to a chunk containing access keys to another object chunk. In one embodiment, the hierarchical file system relationships are stored in structural chunks using access keys. In one embodiment, data and/or metadata associated with a structural chunk is stored as one or more separate chunks in the content-addressable storage system. In one embodiment, file object chunks 210-218 and 250 include access key/s to one or more chunks containing file metadata and/or file data, and directory object chunks 202-208 and 252-256 include access key/s to one or more chunks containing directory metadata and/or directory content data. The use of structural chunks to implement a file system structure is described in further detail in U.S. patent application Ser. No. 14/086,197 filed Nov. 21, 2013, entitled REPRESENTING DIRECTORY STRUCTURE IN CONTENT-ADDRESSABLE STORAGE SYSTEMS, the entire contents of which are hereby incorporated by reference as if fully set forth herein.

While the arrangement of object chunks in file system hierarchy 200 reflects the hierarchical relationship between the directories and files to which the object chunks correspond, the actual arrangement of the object chunks within a chunk store may have no relationship to that hierarchy. For example, the object chunks may be distributed across multiple storage devices, such as in a cloud storage system.

File system hierarchy 240 represents directory structure within a file system volume before a file system volume modification. As used herein, the term "hierarchy" includes but is not limited to a tree. In one embodiment, file system hierarchy 240 is any directed acyclic graph (DAG). It is possible for any given object chunk or sub-hierarchy of object chunks to belong to multiple file system hierarchies within global hierarchy 200. For example, first file system hierarchy 240 shares one or more chunks with second file system hierarchy 242, where first file system hierarchy 240 and second file system hierarchy 242 correspond to the same file system volume at different points in time (i.e. before and after the file system modification illustrated). It is also possible for any given object chunk or subtree of object chunks to belong file system hierarchies for different file system volumes. It is also possible for the same object chunk to belong to multiple folders within a file system volume. For example, file system hierarchy 240 includes file object chunk 218, which represents a file, "TEXT FILE", belonging to both folder "DOCS" and "PHOTOS". Global hierarchy 200 may represent chunks stored for multiple file system volumes in the same content-addressable storage system. However, a cache of child-to-parent mappings corresponding to a file system volume will only include child-to-parent mappings for the specific file system volume.

Object chunks 202-218 are arranged in a manner that reflects the hierarchical relationship between the objects stored in file system hierarchy 240. As indicated by file system hierarchy 240, files "FILE 1"-"FILE N" (corresponding to object chunks 212-216) reside in the directory "PPTS" (corresponding to directory object chunk 208). The directory "PPTS" is a child of the directory "DOCS" (corresponding to directory object chunk 204), which in turn is a child of the directory "JACK" (corresponding to directory object chunk 202), which is the root directory of file system hierarchy 240. Object chunk 202 is a root object chunk of file system hierarchy 240 of a particular file system volume. The entire file system volume is accessible using the access key of root object chunk 202 to traverse file system hierarchy 240. Subtree 230 includes object chunks for the contents of "FOLDER X", which is represented by directory object chunk 216.

File System Volume Modification

When a file system hierarchy is implemented using a chunk store, the addition, modification or removal of a single file may necessitate changes to the corresponding object chunk as well as every ancestor object chunk thereof in the file system hierarchy. Specifically, because the files are implemented by object chunks that are addressed based on content, the modification of the single file causes creation of new directory object chunks for every directory that is above the file in the file system hierarchy, since the respective access keys referenced in the ancestor directory object chunks must also be updated. File system hierarchy 242 represents directory structure within the same file system volume after the file system volume modification described.

For example, assume that an authorized user of the file system volume modifies "FILE 1" (corresponding to object chunk 212). Because the modification to "FILE 1" changes the content of the object chunk, and chunks are addressed based on content in the content-addressable storage system, the modified data is not simply stored over object chunk 212 (corresponding to the previous version of "FILE 1"). Rather, the a new object chunk 250 corresponding to the modified version of "FILE 1" is generated and stored in the content-addressable storage system. New object chunk 250 is stored separately from object chunk 212.

Because the current version of "FILE 1" corresponds to new object chunk 250, directory object chunk 208 (corresponding to the parent directory "PPTS") must also be updated to point to the new object chunk 254 the current version of "FILE 1". To update the directory "PPTS" in the file system volume, a new directory object chunk 252 is generated and stored. The new directory object chunk 252 (corresponding to the updated version of directory "PPTS") points to object chunk 254 (corresponding to the updated version of "FILE 1") and does not point to object chunk 212 (corresponding to the previous version of "FILE 1"). Similarly, the original directory object chunk 204 (corresponding to directory "DOCS") must also be updated to point to the new chunk for the "PPTS" directory. To update the directory "DOCS", a new directory object chunk 254 is generated and stored for directory "DOCS". For similar reasons, new directory object chunk 256 is stored for the root directory "JACK" that is the parent of "DOCS". After the modification of "FILE 1", the new directory object chunk 256 is used to access the entire file system volume.

Because directory object chunks 206, 210 and 216 are not ancestors of modified object chunk 212, these directory object chunks do not need to be modified in file system hierarchy 242. Furthermore, no modifications are necessary for any child chunk in subtree 230 of directory object chunk 216.

As a consequence of the modification to "FILE 1", several chunks have become "stale". A stale chunk is a chunk whose data no longer reflects the current state of the file system volume. In the example given above, the update to "FILE 1" causes object chunks 212, 208, 204 and 202 to become stale. The more updates that are performed, the more chunks become stale.

Child-to-Parent Mappings

A cache of child-to-parent mappings includes one or more child-to-parent mappings. A child-to-parent mapping corresponds to a particular child chunk in a file system hierarchy. File system hierarchy 240 represents the directory structure for a file system volume stored in a content-addressable storage system. The child-to-parent mapping maps the particular chunk to a parent chunk in file system hierarchy 240. A chunk may have more than one parent, so multiple child-to-parent mappings may correspond to a particular chunk. FIGS. 3A-3C are block diagrams depicting embodiments of a cache of child-to-parent mappings.

FIG. 3A is a block diagram depicting an embodiment of a cache of child-to-parent mappings corresponding to the file system volume of FIG. 2 before a file system volume modification. Before the modification of "FILE 1", the root chunk of the file system volume is object chunk 202. Cache 300 includes a plurality of child-to-parent mappings corresponding to file system hierarchy 240, which starts from root chunk 202. For each child object chunk in file system hierarchy 240, cache 300 includes one or more child-to-parent mappings that map the child chunk to its parent chunk/s.

Because object chunk 218 has two parents, object chunk 200 and object chunk 206, two child-to-parent mappings are stored for object chunk 218. When a child chunk has multiple parent chunks, the multiple child-to-parent mappings may be stored as a multiple-map structure from the child chunk to a set of parent chunks. However, even if a multiple-map structure is stored, the multiple-map structure represents the multiple underlying child-to-parent mappings.

In one embodiment, a child chunk is mapped to a parent chunk using the access keys of the respective chunks. For example, if the access key of a chunk is a hash value of the chunk, i.e. H(chunk), then a child-to-parent mapping would map H(child chunk) to H(parent chunk). For simplicity, the label of each chunk, as presented in FIG. 2, is used to represent the access key in cache 300 and other embodiments of the cache of child-to-parent mappings shown hereafter.

FIG. 3B is a block diagram depicting an embodiment of a cache of child-to-parent mappings corresponding to the file system volume of FIG. 2 after a file system volume modification. After the modification of "FILE 1", the root chunk of the file system volume is object chunk 256. Cache 310 includes a plurality of child-to-parent mappings corresponding to file system hierarchy 242, which starts from the current root chunk of the file system volume (i.e. object chunk 256). For each child object chunk in file system hierarchy 242, cache 310 includes one or more child-to-parent mappings that map the child chunk to its parent chunk/s.

In one embodiment, a cache of child-to-parent mappings may be generated by traversing a file system hierarchy from the root chunk of the file system volume. Alternatively and/or in addition, a cache of child-to-parent mappings may be maintained by updating the cache after one or more file system volume modifications. Versions of the cache of child-to-parent mappings can be persistently stored as one or more mapping chunks in the content-addressable storage system. Procedures for updating a cache of child-to-parent mappings are described below in greater detail. The procedures described herein will properly update the cache for chunk-level changes (e.g. additions, deletions, and modifications), hierarchy-level changes (e.g. moving the root chunk up or down the hierarchy) and volume-level changes (e.g. moving from an empty file system volume to a populated file system volume, or vice versa). In FIGS. 3A-3B, chunks represented by subtree 230 of FIG. 2 are omitted from cache 300 and cache 310.

Cache 300 corresponds to file system hierarchy 240, which is identifiable by its root chunk 202. Cache 310 corresponds to file system hierarchy 242, which is identifiable by its root chunk 256. In one embodiment, the cache of child-to-parent mappings corresponding to a file system hierarchy is stored with the root chunk of the file system hierarchy to identify the corresponding version of the file system volume. In one embodiment, a cache container object is used to store this association.

FIG. 3C is a block diagram depicting an embodiment of a cache container chunk. Cache container chunk 320 includes root chunk access key 322 and one or more mapping chunk access keys 324. Root chunk access key 322 corresponds to the root chunk of the file system hierarchy corresponding to the mappings stored in the cache of child-to-parent mappings. Mapping chunk access key/s 324 corresponds to one or more chunks stored in the content-addressable storage system. For example, one or more mapping chunk access key/s 324 may be stored for one or more single-map data structures and/or multiple-map data structures described in greater detail below at FIG. 6.

In one embodiment, cache 300 is stored in a different chunk store than object chunks of the corresponding file system hierarchy, including the root chunk. In this case, the access key of the root chunk may further include a chunk store address or other identifier.

Determining Ancestor Chunks

The cache of child-to-parent mappings may be used to determine ancestor chunks of a particular chunk. This functionality may not be necessary when a particular chunk is obtained by traversing a file system hierarchy. However, a chunk does not always need to be obtained by traversing a file system hierarchy. For example, a chunk may be returned by performing a search based on one or more chunk indexes. Chunk indexes are described in greater detail below with respect to FIG. 6

To determine the ancestor chunks of a particular chunk, the child-to-parent mappings of the cache are used to obtain the next ancestor chunk until the root chunk is reached. An embodiment of a process for using the cache of child-to-parent mappings to determine at least one ancestor of a chunk is described below in further detail at FIG. 10.

In one embodiment, the child-to-parent mappings of the cache are used to obtain the complete path of a particular chunk by obtaining the next ancestor chunk until the root chunk of the file system volume is returned. For example, after the file system volume modification of "FILE 1", a path be generated for "FILE 1" (object chunk 250) based on cache 310. For chunk 250, cache 310 includes a child-to-parent mapping identifying chunk 252 ("PPTS") as the parent. For chunk 252, cache 310 includes a child-to-parent mapping identifying chunk 254 ("DOCS") as the parent. For chunk 254, cache 310 includes a child-to-parent mapping identifying chunk 256 ("JACK") as the parent. Cache 310 does not include a child-to-parent mapping for chunk 256 because chunk 256 is the root chunk of file system hierarchy 240. Based on the child-to-parent mappings of cache 310, the path for "FILE 1" is "JACK/DOCS/PPTS/FILE 1".

Updating a Cache of Child-to-Parent Mappings

As described in FIG. 2, one or more modifications to the file system volume will cause the file system hierarchy to be modified, and will further cause a new root chunk to be generated for the file system volume. After such modifications, the cache of child-to-parent mappings will need to be updated to reflect the modified file system hierarchy, thereby synchronizing the cache of child-to-parent mappings with the file system volume. In one embodiment, the cache of child-to-parent mappings is updated each time that a new root chunk is generated for the file system volume. Alternatively and/or in addition, the cache of child-to-parent mappings may be updated at a different interval based on time, changes, or other factors.

Given a first version of a cache of child-to-parent mappings associated with a prior root chunk of a prior file system hierarchy, the cache of child-to-parent mappings can be updated based on the prior root chunk and the new root chunk of the file system hierarchy corresponding to a current version of the file system volume. In one embodiment, when the root chunk access key is stored in association with the child-to-parent mappings, such as in cache container chunk 320, the cache of child-to-parent mappings can be updated by simply providing the new root chunk of the file system hierarchy after one or more updates.

The cache of child-to-parent mappings is updated by (1) adding one or more first child-to-parent mappings based on traversing at least a portion of a current file system hierarchy from the new root chunk, and (2) removing one or more second child-to-parent mappings based on traversing at least a portion of a prior file system hierarchy from the prior root chunk. Based on the procedures described herein, the cache update may be performed in an amount of time that is proportional to the number of changes (i.e. additions and/or deletions of chunks). FIGS. 4A-4B are block diagrams depicting embodiments of a cache of child-to-parent mappings that is under modification. The addition of mappings based on the new root chunk and the removal of mappings based on the prior root chunk are described below in further detail.

Adding Mappings Based on New Root Chunk

To update a cache of child-to-parent mappings last updated based on a prior file system hierarchy, one or more child-to-parent mappings are added based on the new root chunk of the current file system hierarchy. At least a portion of the current file system hierarchy is traversed from the new root chunk. In the traversal, the relationships between a parent chunk and any of its child chunks are evaluated. If it is determined that any particular child chunk also needs to be further processed, then the traversal proceeds to the children of the particular child chunk. In one embodiment, the traversal is implemented as a recursive process performed on a current parent chunk and its child chunks. In a recursive call, when it is determined that the children of a particular child chunk need to be further processed, the particular child chunk is established as the current parent chunk for the duration of the recursive call.

In one embodiment, a modification to a particular chunk in a file system hierarchy requires a new version of all ancestor chunks of the particular chunk to be generated, including a new version of the root chunk. In this case, it may be assumed that all new child-to-parent relationships in the current file system hierarchy can be traversed from the new root chunk. Furthermore, only chunks that newly added to the file system hierarchy may have new child chunks. These principles can be used to help determine subtrees of one or more chunks that do not need to be evaluated when traversing the file system hierarchy. As used herein, the term "subtree" may include any DAG, including a single node with no children.

In general, common subtrees (i.e. subtrees shared by the current file system hierarchy and the prior file system hierarchy) do not need to be evaluated for new child-to-parent relationships. Given the new root chunk of the current file system hierarchy and the cache of child-to-parent mappings corresponding to the prior file system hierarchy, the process of adding one or more child-to-parent mappings based on the new root chunk may be performed in an amount of time that is proportional to the number new chunks.

In one embodiment, when processing a current parent chunk, each child chunk of the current parent chunk is evaluated. For each child chunk, if the cache already contains a child-to-parent mapping from the child chunk to the current parent chunk, then the child chunk does not need to be traversed. In this case, the child chunk is part of a common subtree between the prior file system hierarchy, and no further processing needs to be performed on the child chunk. If the cache does not contain a child-to-parent mapping that maps the child chunk to the current parent chunk, a child-to-parent mapping from the child chunk to the current parent chunk is added to the cache. If the cache did not contain any child-to-parent mapping that maps the child chunk to any chunk before the addition, then the child chunk needs to be processed in the same manner as the current parent chunk.

In one embodiment, the child chunk is processed by calling a recursive add function that evaluates the children of a particular chunk as described. The recursive add function is initially called on the root chunk of the current file system hierarchy. The following pseudocode outlines an embodiment of a recursive add function suitable for recursively adding one or more child-to-parent mappings in an amount of time that is proportional to the number of new chunks:

```
add_mappings_recursive(parent)
{   for each child of parent
    {   prior_mapped_parents = get_mapped_parents(cache,
            child);
        if (prior_mapped_parents contains current_parent) continue;
        else add_mapping(child, parent);
        if (prior_mapped_parent is empty) add_root_recursive(child);
    }
}
```

In one embodiment, each time the recursive add function is called on a particular chunk, the particular chunk is added to a list of new chunks. The list of new chunks includes all of the new chunks added to the file system hierarchy since the last update. The list of new chunks may be used to perform one or more file system maintenance functions, such as index updates, file system volume size calculations, and other content-addressable storage system maintenance activities, embodiments of which are described in greater detail below.

FIG. 4A is a block diagram depicting an embodiment of a cache of child-to-parent mappings after a mapping addition process. Cache 400 is shown in the middle of an update process. Cache 400 originally contained mappings corresponding to prior file system hierarchy 240. After a mapping addition process based on root chunk 256 of current file system hierarchy 242, the mappings shown in bold are added.

In one embodiment, a recursive add function is initially called on new root chunk 256. In processing child chunks 254 and 206 of new root chunk 256, the recursive add function is also called on chunk 254. In processing child chunks 252 and 218 of chunk 254, the recursive add function is also called on child chunk 252. In processing child chunks 250, 214 and 216 of chunk 252, the recursive add function is also called on child chunk 250.

The number of times the recursive add function is called is equal to the number of new chunks in current file system hierarchy 242 that are not present in prior file system hierarchy 240. In one embodiment, because the recursive add function is called on chunks 256, 254, 252 and 250, chunks 266, 254, 252 and 250 are added to a list of new chunks, which may be used to perform other content-addressable storage system maintenance activities.

When the recursive add function is configured to evaluate child chunks of a particular chunk from left to right, based on the order shown in FIG. 2, the chunks are evaluated in the following order: 254, 252, 250, 214, 216, 218, 206. Likewise, the child-to-parent mappings are added in the order 402-414.

Figure 8:
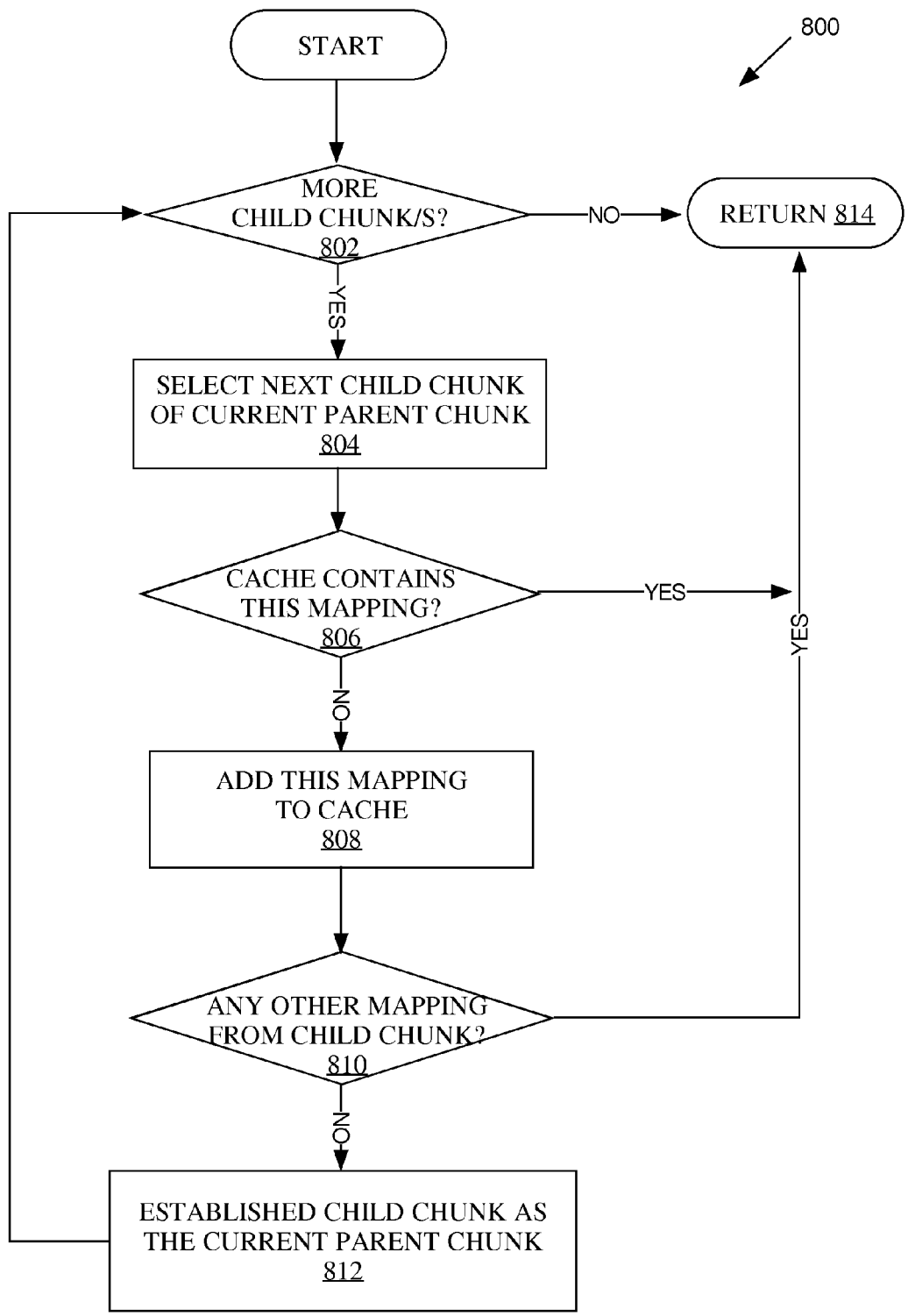
FIG. 8 is a flowchart illustrating an embodiment of a process for adding one or more child-to-parent mappings based on a new root chunk.

An embodiment of a process for adding one or more child-to-parent mappings based on a new root chunk is described in further detail at FIG. 8.

Removing Mappings Based on Prior Root Chunk

To update a cache of child-to-parent mappings previously synchronized with a prior file system hierarchy, one or more child-to-parent mappings are removed based on the prior root chunk of the prior file system hierarchy. At least a portion of the prior file system hierarchy is traversed from the prior root trunk. In the traversal, the relationships between a parent chunk and any of its child chunks are evaluated. If it is determined that one or more particular child chunk also needs to be evaluated, then the traversal proceeds to the children of the particular child chunk. In one embodiment, the traversal is implemented as a recursive process performed on a current parent chunk and its child chunks. In a recursive call, when it is determined that the children of a particular child chunk should be evaluated, the particular child chunk is established as the current parent chunk for the duration of the recursive call.

After adding child-to-parent mappings based on the new root chunk as described above, the cache of child-to-parent mappings contains a mapping for all child-to-parent relationships in both the prior file system hierarchy and the current file system hierarchy. At this point, all the child-to-parent relationships that only exist in the prior file system hierarchy should be removed. It may be assumed that all child-to-parent relationships that only exist in the prior file system hierarchy can be traversed from the prior root chunk.

In one embodiment, when processing a current parent chunk, each child chunk of the current parent chunk is evaluated. The mapping corresponding to the relationship between the child chunk and the current parent chunk is removed from the cache of child-to-parent mappings. If the cache still contains another child-to-parent mapping for the child chunk, then further processing is unnecessary because any subtree from the child chunk will be a common subtree to both the current file system hierarchy and the prior file system hierarchy. However, if the cache no longer contains any child-to-parent mappings that map the child chunk to any chunk, then the child chunk needs to be processed in the same manner as the current parent chunk.

In one embodiment, the child chunk is processed by calling a recursive remove function that evaluates the children of the particular chunk is described. The recursive removed function is initially called on the prior root chunk of the prior file system hierarchy. The following pseudocode outlines an embodiment of a recursive remove function suitable for recursively removing one or more child-to-parent mappings in an amount of time that is proportional to the number of all chunks no longer present in the current file system hierarchy:

```
remove_mappings_recursive(parent)
{   for each child of parent
    {   remove_mapping(child, root);
        if (child has no more parents)
            remove_mappings_recursive(child);
    }
}
```

In one embodiment, each time the recursive remove function is called on a particular chunk, the particular chunk is added to the list of removed chunks. The list of removed chunks includes all the chunks present at the last update that are no longer present in the file system hierarchy. The list of removed chunks may be used to perform one or more file system maintenance functions, such as index updates, file system volume size calculations, and other content-addressable storage system maintenance activities, embodiments of which are described in greater detail below.

FIG. 4B is a block diagram depicting an embodiment of the cache of child-to-parent mappings after a mapping removal process. Cache 450 is shown after the mapping removal process, including all changes made from cache 400, which includes all of the child-to-parent mappings in both prior file system hierarchy 240 and current file system hierarchy 242.

In one embodiment, a recursive remove function is initially called on prior root chunk 202. In processing child chunks 204 and 206 of prior root chunk 202, the recursive remove function is also called on chunk 204. In processing child chunks 208 and 210 of chunk 204, the recursive remove function is also called on chunk 208. In processing child chunks 212, 214 and 216 of chunk 208, the recursive remove function is also called on chunk 212.

The number of times of recursive remove function is called is equal to the number of all chunks in prior file system hierarchy 240 that are no longer present in new file system hierarchy 242. In one embodiment, because the recursive remove function is called on chunks 202, 204, 208 and 212, chunks 202, 204, 208 and 212 are added to a list of removed chunks, which may be used to perform other content-addressable storage system maintenance activities.

When the recursive remove function is configured to evaluate child chunks of a particular chunk from left to right, based on the order shown in FIG. 2, the chunks are evaluated in the following order: 202, 204, 209, 212, 214, 216, 218, 206. Likewise, the child-to-parent mappings are added in the order 452-464.

Figure 9:
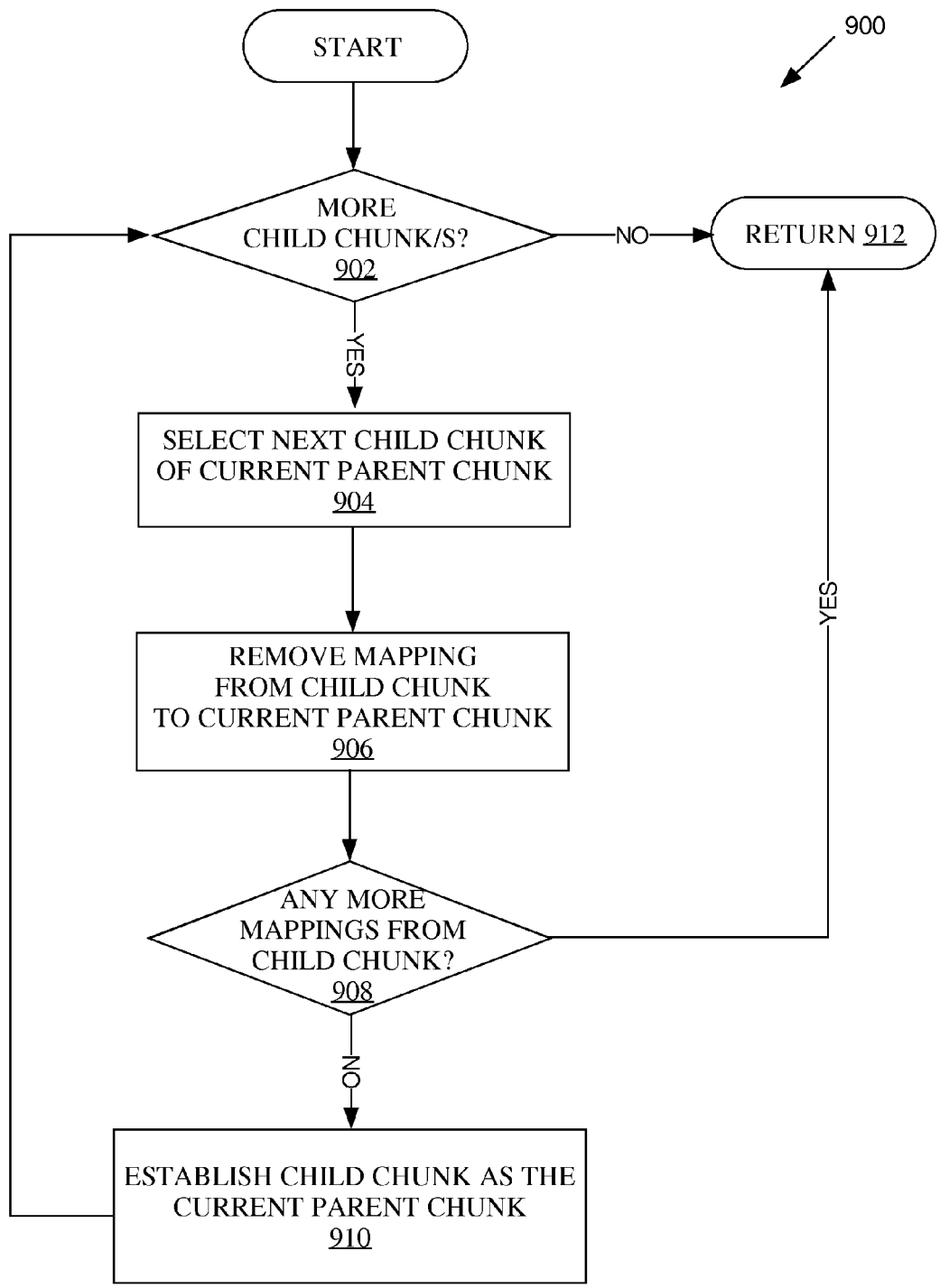
FIG. 9 is a flowchart illustrating an embodiment of a process for removing one or more child-to-parent mappings based on a prior root chunk.

An embodiment of a process for removing one or more child-to-parent mappings based on a prior root chunk is described in further detail at FIG. 9.

File System Volume Changes

When the cache of child-to-parent mappings is updated, it is possible to identify all of the changes to the file system hierarchy that occurred since the last update, including a list of chunks that have been added to the file system hierarchy as well as a list of chunks that have been removed from the file system hierarchy. In one embodiment, the chunks that are added to and/or removed from the file system hierarchy correspond to files and/or folders, and may include access keys that link to other data and/or metadata chunks of the corresponding file or folder.

The identified changes to the file system hierarchy may be used to perform one or more file system maintenance functions, such as index updates, file system volume size calculations, and other content-addressable storage system maintenance activities. For example, given a previously calculated size of a file system volume, a new size of the file system volume can be calculated by adding the size of the added chunks and removing the size of the removed chunks, including any metadata and/or data chunks referred to by the added and/or removed chunks. This may sound straightforward in the case of a file system hierarchy that is representable by a tree, i.e. where each node has one parent. The method also works in the non-trivial case where the file system hierarchy is representable by a DAG, i.e. where a sub-graph may have multiple parents. In other words, we can incrementally compute the true size of the file system hierarchy incrementally when the DAG representing the file system hierarchy evolves.

Maintaining Chunk Indexes

Figure 5A:
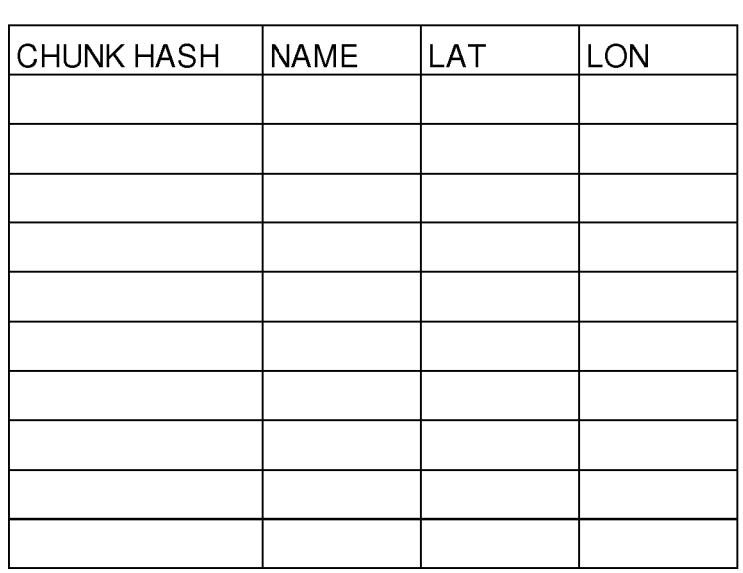
FIG. 5A-5B are block diagrams depicting embodiments of a chunk index.
Figure 5B:
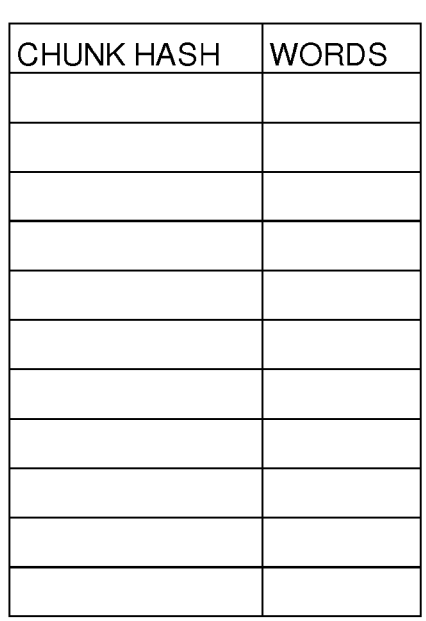

The content-addressable storage system may be configured to maintain one or more chunk indexes. As used herein, the term "chunk index" refers to an index, such as a full text index or a flat file index, relating data and/or metadata associated with the a chunk to the access key of the chunk, such as the hash value of the chunk. In one embodiment, the primary key of a chunk index is the chunk access key. In one embodiment, a chunk index is configured to index object chunks corresponding to files and/or folders corresponding to one or more file system volumes. A chunk index may also be configured to index object chunks corresponding to a directory within one or more file system volumes. FIG. 5A-5B are block diagrams depicting embodiments of a chunk index.

FIG. 5A is a block diagram depicting a chunk metadata index. A chunk metadata index includes metadata corresponding to one or more chunks. The index associates the searchable metadata of a chunk with the access key for the chunk, such as the chunk hash value. The index may be used to search the metadata fields based on one or more search terms and return the access key of chunks that match the search terms. Chunk metadata index 500 associates a hash value of a plurality of chunks with name metadata, latitude metadata and longitude metadata for the corresponding chunks.

FIG. 5B is a block diagram depicting a chunk text index. A chunk text index includes text data corresponding to one or more chunks. The text data may include processed and/or unprocessed text corresponding to the chunk. The index associates the searchable text data with the access key for the corresponding chunk, such as the hash value of the corresponding chunk. In one embodiment, the chunk text index includes access keys for file object chunks that each link to one or more data chunks that store the actual file data for the corresponding file, and the corresponding text data is generated based on the actual file data stored in the one or more data chunks. Chunk text index 510 associates a hash value of the plurality of chunks with processed and/or unprocessed text data for the corresponding chunks.

When updating a cache of child-to-parent mappings, a list of added chunks and remove chunks may be generated for the corresponding file system volume. To synchronize an index associated with the corresponding file system volume, chunks removed from the file system volume can be removed from an index associated with the file system volume. For chunks added to the file system volume, new entries may be added to the index after analyzing the added chunks and/or chunks identified by access key is stored in the added chunks, such as metadata chunks and/or file data chunks.

Child-to-Parent Mapping Data Structures

An implementation of the child-to-parent mappings could store each child-to-parent mapping as an association between the hash value of a child to a set of hash values corresponding to the one or more parents. However, in many file system hierarchies, the most commonly observed relationship will be a one-to-one child-to-parent relationship, where most children have just one parent. In order to optimize the storage of the child-to-parent mapping, the child-to-parent mappings may be stored in two separate data structures. One data structure is optimized for storing mappings from a child to a single parent, while the second data structure is optimized for storing mappings from a child to multiple parents. The second data structure is usually very small and can be easily cached. Since the first data structure has fewer indirections than the second data structure, that makes the entire set of child-to-parent mappings is more compact and faster to access overall.

In one embodiment, child-to-parent mappings are stored as at least one chunk in a content-addressable storage system. A chunk may have more than one parent, so multiple child-to-parent mappings may correspond to a particular chunk. When a child chunk has multiple parent chunks, the multiple child-to-parent mappings may be stored as a multiple-map structure from the child chunk to a set of parent chunks, where the multiple-map structure represents the multiple underlying child-to-parent mappings.

Figure 6:
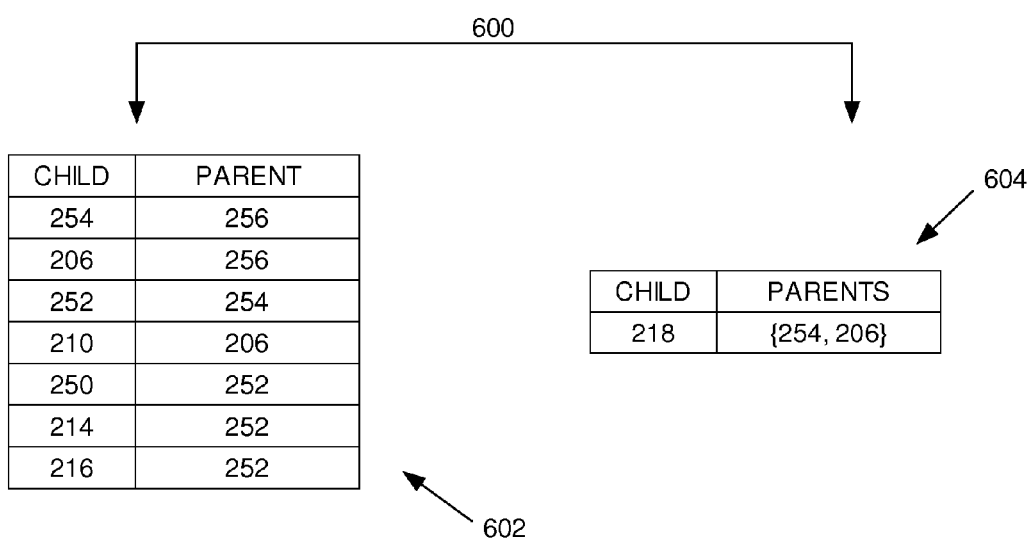
FIG. 6 is a block diagram depicting an embodiment of a cache of child-to-parent mappings.

FIG. 6 is a block diagram depicting an embodiment of a cache of child-to-parent mappings. Cache 600 includes a plurality of child-to-parent mappings for to a file system volume corresponding to file system hierarchy 242 of FIG. 2. Cache 600 includes single-map data structure 602 and multiple-map data structure 604. Single-map data structure 602 is configured to store child-to-parent mappings for chunks that have exactly one parent chunk in file system hierarchy 242. Each one-to-one mapping between a child chunk and a parent chunk in file system hierarchy 242 is stored as one entry in single-map data structure 602, where each entry is a hash-to-hash mapping.

Multiple-map data structure 604 is configured to store child-to-parent mappings for chunks that have two or more parent chunks in file system hierarchy 242. Each one-to-many mapping between a child chunk and its parent chunks in file system hierarchy 242 is stored as one entry in multiple-map data structure 604. In one embodiment, each entry of multiple-map data structure 604 is represented by a hash-to-hash-set mapping in the content-addressable storage system. The hash-to-hash-set mapping is described in further detail in U.S. patent application Ser. No. 14/086,197 filed Nov. 21, 2013, entitled REPRESENTING DIRECTORY STRUCTURE IN CONTENT-ADDRESSABLE STORAGE SYSTEMS, the entire contents of which are hereby incorporated by reference as if fully set forth herein.

In one embodiment, each chunk of file system hierarchy 242, other than root chunk 256, is represented by exactly one relationship item in either single-map data structure 602 or multiple-map data structure 604 of cache 600. When a modification to the file system volume reduces the number of parents of particular chunk to one, an update to cache 600 may move the particular chunk from multiple-map data structure 604 to single-map data structure 602. When a modification to the file system volume increases the number of parents of particular chunk to more than one, an update to cache 600 may move the particular chunk from single-map data structure 602 to multiple-map data structure 604.

Process for Updating a Cache Parent of Child-to-Parent Mappings

Figure 7:
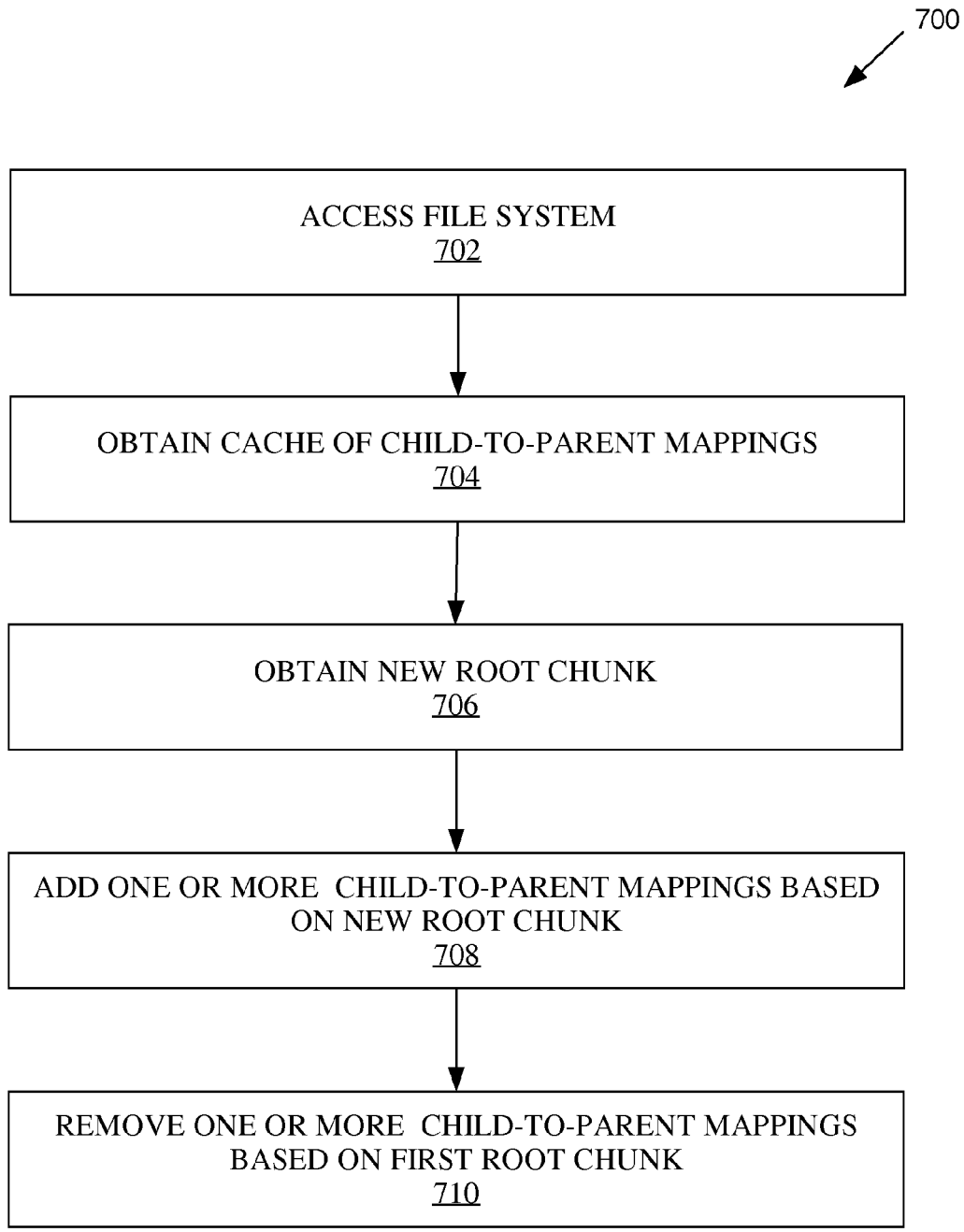
FIG. 7 is a flowchart illustrating an embodiment of a process for updating a cache of child-to-parent mappings based on a new root chunk.

FIG. 7 is a flowchart illustrating an embodiment of a process for updating a cache of child-to-parent mappings based on a new root chunk. In one embodiment, process 700 is performed by chunk store server 112.

At block 702, the file system volume is accessed. The file system volume is stored as a hierarchy of chunks in a content-addressable storage system. The file system volume is associated with a first root chunk of the file system hierarchy.

At block 704, a cache of child-to-parent mappings corresponding to the file system volume is obtained. In one embodiment, the cache of child-to-parent mappings is obtained from a content-addressable storage system. For example, the cache of child-to-parent mappings may be requested from a server of the content-addressable storage system. In one embodiment, versions of the cache of child-to-parent mappings are each stored as one or more chunks in the content-addressable storage system. In one embodiment, if a cache of child-to-parent mappings does not exist for the file system volume, a server of the content-addressable storage system may be configured to generate the cache of child-to-parent mappings for the file system volume.

At block 706, a new root chunk is obtained. In one embodiment, a change to the file system hierarchy of the file system volume causes the new root chunk to become associated with the file system volume.

At block 708, one or more child-to-parent mappings are added to the cache of child-to-parent mappings. The one or more child-to-parent mappings are added based on traversing at least a portion of a current file system hierarchy based on the new root chunk. In one embodiment, the one or more child-to-parent mappings are added as the current file system hierarchy is recursively traversed beginning with the new root chunk. An embodiment of a process for adding one or more child-to-parent mappings based on a new root chunk is described in FIG. 8.

At block 710, one or more child-to-parent mappings are removed from the cache of child-to-parent mappings. The one or more child-to-parent mappings are removed based on traversing at least a portion of a prior file system hierarchy based on the first root chunk, i.e. the root chunk previously associated with the file system volume. In one embodiment, the one or more child-to-parent mappings are added as the prior file system hierarchy is recursively traversed beginning with the first root chunk. An embodiment of a process for removing one or more child-to-parent mappings based on a prior root chunk is described in FIG. 9.

Process for Adding Child-to-Parent Mappings

FIG. 8 is a flowchart illustrating an embodiment of a process for adding one or more child-to-parent mappings based on a new root chunk. Process 800 adds one or more child-to-parent mappings to the cache of child-to-parent mappings by traversing at least a portion of the current file system hierarchy from the new root chunk. In one embodiment, process 800 is performed by chunk store server 112.

Process 800 traverses a portion of a current file system hierarchy from the new root chunk. In one embodiment, process 800 is implemented as a recursive process performed on a current parent chunk and its child chunks. In a recursive call, a child chunk is established as the current parent chunk for the duration of the recursive call. Process 800 begins at block 802 with the new root chunk established as the current parent chunk.

At decision block 802, it is determined whether the current chunk has any child chunks that have not yet been processed. If the current chunk has unprocessed child chunks, processing continues to block 804. Otherwise, processing continues to block 814, where process 800 returns.

At block 804, the next child chunk of the current chunk is selected, which shall be referred to in this section as the "current child chunk."

At decision block 806, it is determined whether the cache of child-to-parent mappings contains a mapping from the selected child chunk to the current chunk, which shall be referred to in this section as "the current child-to-parent mapping." If the cache of child-to-parent mappings contains the current child-to-parent mapping, processing continues to block 814, where process 800 returns. When the cache of child-to-parent mappings already contains the current child-to-parent mapping, the subtree of the current child chunk does not need to be evaluated because the presence of the current child-to-parent mapping in the cache shows that the cache should already contain child-to-parent mappings for the current child chunk's children. If the cache of child-to-parent mappings does not contain the current child-to-parent mapping, processing continues to block 808.

At block 808, the current child-to-parent mapping is added to the cache of child-to-parent mappings.

At decision block 810, it is determined whether the cache of child-to-parent mappings contains any child-to-parent mappings for the current child chunk other than the current child-to-parent mapping added at block 808. If the cache of child-to-parent mapping contains another mapping, then processing continues to block 814, where process 800 returns. When the cache of child-to-parent mappings contains another mapping, the subtree of the current child chunk does not need to be evaluated because the presence of another mapping from child chunk in the cache shows that the cache should already contain child-to-parent mappings for the current child chunk's children. If the cache of child-to-parent mapping does not contain another mapping other than the current child-to-parent mapping added at block 808, then processing continues to block 812.

At block 812, the current child chunk is established as the current parent chunk. Processing continues to decision step 802, and process 800 is performed on the newly established current parent chunk.

At block 814, process 800 returns and/or terminates. For example, processing may continue to passing control to a calling process including a recursive process, generating any appropriate record or notification, returning after a method or function invocation, or otherwise terminating.

Process for Removing Child-to-Parent Mappings

FIG. 9 is a flowchart illustrating an embodiment of a process for removing one or more child-to-parent mappings based on a prior root chunk. Process 900 removes one or more child-to-parent mappings from the cache of child-to-parent mappings by traversing at least a portion of a prior file system hierarchy from the prior root chunk. In one embodiment, process 800 is performed by chunk store server 112.

Process 900 traverses a portion of a prior file system hierarchy from the prior root chunk. In one embodiment, process 900 is implemented as a recursive process performed on a current parent chunk and its child chunks. In a recursive call, a child chunk is established as the current parent chunk. Process 900 begins at block 902 with the prior root chunk established as the current parent chunk.

At decision block 902, it is determined whether the current chunk has any child chunks that have not yet been processed. If the current chunk has unprocessed child chunks, processing continues to block 904. Otherwise, processing continues to block 912, where process 800 returns.

At block 904, the next child chunk of the current chunk is selected, which shall be referred to in this section as the "current child chunk."

At block 906, a child-to-parent mapping from the current child chunk to the current parent chunk is removed.

At decision block 908, it is determined whether the cache of child-to-parent mappings contains any more child-to-parent mappings from the current child chunk. If the cache of child-to-parent mappings does contain another child-to-parent mapping from the current child chunk, processing continues to block 912, where process 900 returns. When the cache of child-to-parent mappings contains another child-to-parent mapping from the current child chunk, the subtree of the current child chunk does not need to be evaluated because the presence of the other child-to-parent mapping from the current child chunk in the cache shows that the subtree of the current child chunk should remain in the cache of child-to-parent mappings. However, in another iteration, it is possible that the last child-to-parent mapping from the current child chunk is removed, in which case child-to-parent mappings corresponding to the subtree of the current child chunk will be removed. If the cache of child-to-parent mappings does not contain another child-to-parent mapping from the current child chunk, processing continues to block 912.

At block 910, the current child chunk is established as the current parent chunk. Processing continues to decision step 902, and process 900 is performed on the newly established current parent chunk.

At block 912, process 912 returns and/or terminates. For example, processing may continue to passing control to a calling process including a recursive process, generating any appropriate record or notification, returning after a method or function invocation, or otherwise terminating.

Process for Determining Ancestors of a Chunk

Figure 10:
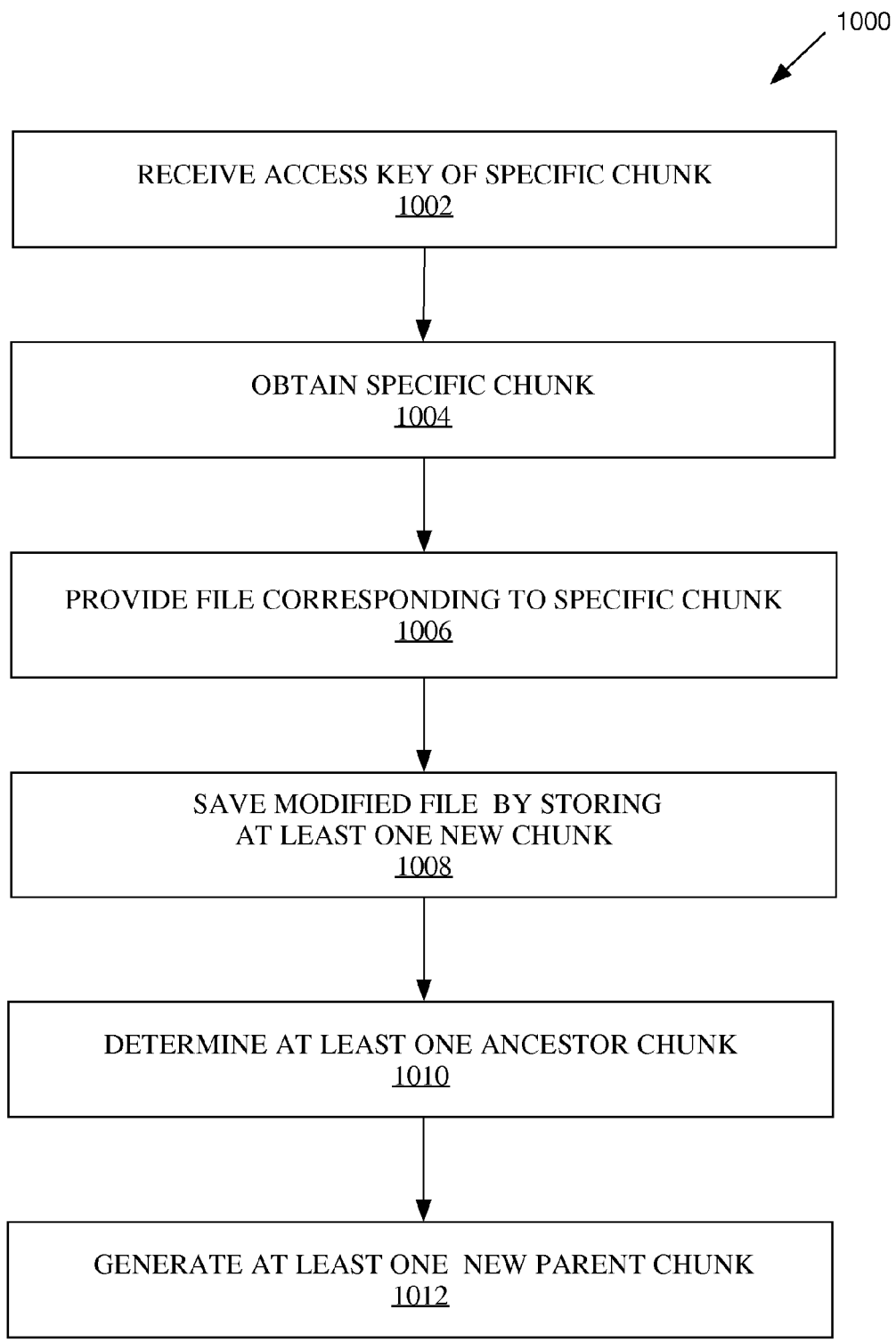
FIG. 10 is a flowchart illustrating an embodiment of a process for using the cache of child-to-parent mappings to determine at least one ancestor of a chunk.

FIG. 10 is a flowchart illustrating an embodiment of a process for using the cache of child-to-parent mappings to determine at least one ancestor of a chunk. Process 1000 may be performed on the client side, such as by chunk system client 110.

At block 1002, a specific chunk access key is received. In one embodiment, the access key of the specific chunk is a generated based on the specific chunk, such as a hash value of the specific. The specific chunk address may be received as a search result returned using a chunk index.

At block 1004, the specific chunk is obtained from the content-addressable storage system using the access key. In one embodiment, the specific chunk is a file object chunk associated with a particular file. The file object chunk includes an access key of a data chunk that stores the file data for the particular file. In one embodiment, the file object chunk also includes an access key of the metadata chunk that stores the file metadata for the particular file.

At block 1006, a file corresponding to the specific chunk is provided. In one embodiment, chunk system client 110 provides the corresponding file to another application of file system client 106 by using a first access key to obtain a file object chunk associated with the file, obtaining a second access key stored in the file object chunk corresponding to file data, and using the second access key to obtain the file data associated with the file. The file corresponding to the specific chunk may be modified by file system client 106.

At block 1008, after the file is modified, the modified file is saved. To save the file, at least one new chunk is stored in the content-addressable storage system. When the file is modified, the modified file is saved to the content-addressable storage system by storing the modified file is one or more chunks in the content-addressable storage system. In one embodiment, the modified file data is stored as one or more file data chunks, and the access key for the file data chunk is stored in a new file object chunk corresponding to the modified file.

At block 1010, at least one ancestor chunk of the specific chunk is determined. The at least one ancestor chunk of the specific chunk is determined based on the cache of child-to-parent mappings associated with the file system in which the file is stored.

At block 1012, at least one new parent chunk is generated based on the at least one ancestor chunk and the new chunk corresponding to the modified file. For each modified chunk, a new parent chunk is generated that includes the access key for the modified chunk. In one embodiment, a new chunk is generated for each ancestor chunk in the path of the modified file, including a new root chunk for the file system volume.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
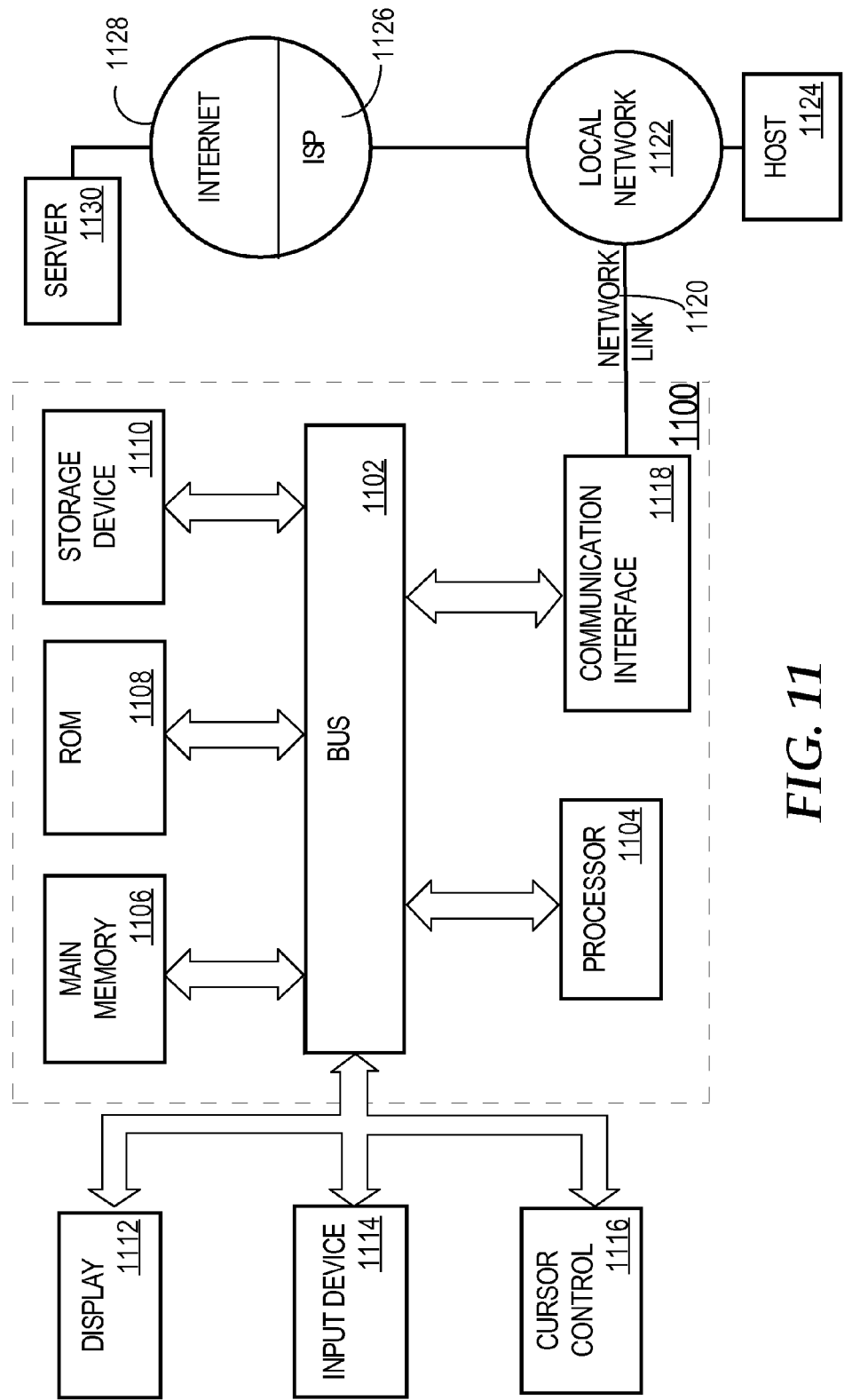
FIG. 11 illustrates a computer system upon which one or more embodiments may be implemented.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or solid-state drive is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1110. Volatile media includes dynamic memory, such as main memory 1106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   maintaining a cache of child-to-parent mappings;
   wherein each child-to-parent mapping corresponds to a particular chunk in a hierarchy of chunks stored in a content-addressable storage system, wherein the content-addressable storage system allows retrieval of items based on data that is generated from content of the items, and maps the particular chunk to a parent chunk in the hierarchy of chunks;

wherein the hierarchy of chunks includes a first root chunk associated with a first file system volume;

in response to a change to the file system volume that causes associating a new root chunk with the first file system volume, updating the cache by adding one or more first child-to-parent mappings based on traversing at least a portion of a current file system hierarchy from the new root chunk, and removing one or more second child-to-parent mappings based on traversing at least a portion of a prior file system hierarchy from the first root chunk.

2. The method of claim 1, wherein updating the cache comprises:

(a) establishing the new root chunk as a current parent chunk;

(b) for each child chunk of the current parent chunk, performing the steps of:

(b1) if the cache does not contain a child-to-parent mapping that maps the child chunk to the current parent chunk, adding this child-to-parent mapping to the cache;

(b2) if the cache did not contain any child-to-parent mapping that maps the child chunk to any chunk before step (b1), then performing step (b) with the child chunk established as the current parent chunk;

(c) establishing the first root chunk as the current parent chunk;

(d) for each child chunk of the current parent chunk, performing the steps of:

(d1) removing from the cache a child-to-parent mapping that maps the child chunk to the current parent chunk; and (d2) if the cache no longer contains any child-to-parent mappings that map the child chunk to any chunk, then performing step (d) with the child chunk established as the current parent chunk.

3. The method of claim 1, further comprising:

receiving a specific hash value;

obtaining a specific chunk based on the specific hash value, wherein the specific chunk corresponds to a file;

when the file is modified, causing the modified file to be saved in the file system, wherein saving the modified file in the first file system volume comprises:

storing at least one new chunk in the content-addressable chunk store based on the modified file;

determining, based on the cache of child-to-parent mappings, at least one ancestor chunk comprising the first root chunk;

generating at least one new parent chunk based on the at least one ancestor chunk and the new chunk, wherein the at least one new parent chunk includes the new root chunk.

4. The method of claim 3, wherein the specific hash value is received based on a search of an index of one or more chunks stored in the content-addressable storage system.

5. The method of claim 1, wherein, for a particular child chunk corresponding to multiple child-to-parent mappings in the cache of child-to-parent mappings, the multiple child-to-parent mappings are stored as one hash-to-hash-set entry.

6. The method of claim 1, wherein the cache is stored as at least one chunk in the content-addressable storage system.

7. The method of claim 1, further comprising:

based on the one or more first child-to-parent mappings added, generating a list of added chunks added to the hierarchy of chunks;

based on the one or more second child-to-parent mappings removed, generating a list of removed chunks removed from the hierarchy of chunks.

8. The method of claim 7, further comprising:

updating a file system size of the first file system volume based on the list of added chunks and the list of removed chunks.

9. The method of claim 7, further comprising updating a local cache of non-payload chunks of the first file system volume based on the list of added chunks and the list of removed chunks.

10. The method of claim 7, further comprising updating an index of one or more chunks stored in the content-addressable storage system based on the list of added chunks and the list of removed chunks.

11. A non-transitory computer-readable medium storing instructions which, when executed by one or more processors, cause the one or more processors to carry out:

maintaining a cache of child-to-parent mappings;

wherein each child-to-parent mapping corresponds to a particular chunk in a hierarchy of chunks stored in a content-addressable storage system, wherein the content-addressable storage system allows retrieval of items based on data that is generated from content of the items, and maps the particular chunk to a parent chunk in the hierarchy of chunks;

wherein the hierarchy of chunks includes a first root chunk associated with a first file system volume;

in response to a change to the first file system volume that causes associating a new root chunk with the first file system volume, updating the cache by adding one or more first child-to-parent mappings based on traversing at least a portion of a current file system hierarchy from the new root chunk, and removing one or more second child-to-parent mappings based on traversing at least a portion of a prior file system hierarchy from the first root chunk.

12. The non-transitory computer-readable medium of claim 11, wherein updating the cache comprises:

(a) establishing the new root chunk as a current parent chunk;

(b) for each child chunk of the current parent chunk, performing the steps of:

(b1) if the cache does not contain a child-to-parent mapping that maps the child chunk to the current parent chunk, adding this child-to-parent mapping to the cache;

(b2) if the cache did not contain any child-to-parent mapping that maps the child chunk to any chunk before step (b1), then performing step (b) with the child chunk established as the current parent chunk;

(c) establishing the first root chunk as the current parent chunk;

(d) for each child chunk of the current parent chunk, performing the steps of:

(d1) removing from the cache a child-to-parent mapping that maps the child chunk to the current parent chunk; and (d2) if the cache no longer contains any child-to-parent mappings that map the child chunk to any chunk, then performing step (d) with the child chunk established as the current parent chunk.

13. The non-transitory computer-readable medium of claim 11, wherein the instructions further cause the one or more processors to carry out:
    receiving a specific hash value;
    obtaining a specific chunk based on the specific hash value, wherein the specific chunk corresponds to a file;
    when the file is modified, causing the modified file to be saved in the file system, wherein saving the modified file in the first file system volume comprises:
        storing at least one new chunk in the content-addressable chunk store based on the modified file;
        determining, based on the cache of child-to-parent mappings, at least one ancestor chunk comprising the first root chunk;
        generating at least one new parent chunk based on the at least one ancestor chunk and the new chunk, wherein the at least one new parent chunk includes the new root chunk.

14. The non-transitory computer-readable medium of claim 13, wherein the specific hash value is received based on a search of an index of one or more chunks stored in the content-addressable storage system.

15. The non-transitory computer-readable medium of claim 11, wherein, for a particular child chunk corresponding to multiple child-to-parent mappings in the cache of child-to-parent mappings, the multiple child-to-parent mappings are stored as one hash-to-hash-set entry.

16. The non-transitory computer-readable medium of claim 11, wherein the cache is stored as at least one chunk in the content-addressable storage system.

17. The non-transitory computer-readable medium of claim 11, wherein the instructions further cause the one or more processors to carry out:
    based on the one or more first child-to-parent mappings added, generating a list of added chunks added to the hierarchy of chunks;
    based on the one or more second child-to-parent mappings removed, generating a list of removed chunks removed from the hierarchy of chunks.

18. The non-transitory computer-readable medium of claim 17, wherein the instructions further cause the one or more processors to carry out:
    updating a file system size of the first file system volume based on the list of added chunks and the list of removed chunks.

19. The non-transitory computer-readable medium of claim 17, wherein the instructions further cause the one or more processors to carry out:
    updating a local cache of non-payload chunks of the first file system volume based on the list of added chunks and the list of removed chunks.

20. The non-transitory computer-readable medium of claim 17, wherein the instructions further cause the one or more processors to carry out:
    updating an index of one or more chunks stored in the content-addressable storage system based on the list of added chunks and the list of removed chunks.

\* \* \* \* \*